(12) United States Patent
Takeda

(10) Patent No.: US 9,289,975 B2
(45) Date of Patent: Mar. 22, 2016

(54) PRINTING DEVICE AND PRINTING METHOD

(71) Applicant: SEIKO EPSON CORPORATION, Tokyo (JP)

(72) Inventor: Yumiko Takeda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 6 days.

(21) Appl. No.: 13/851,449

(22) Filed: Mar. 27, 2013

(65) Prior Publication Data

US 2013/0265357 A1 Oct. 10, 2013

(30) Foreign Application Priority Data

Apr. 9, 2012 (JP) ................................. 2012-088186

(51) Int. Cl.
*B41J 2/045* (2006.01)
*B41J 2/21* (2006.01)
*H04N 1/50* (2006.01)

(52) U.S. Cl.
CPC ............ *B41J 2/04535* (2013.01); *B41J 2/2132* (2013.01); *H04N 1/50* (2013.01)

(58) Field of Classification Search
CPC ................ B41J 2/01; B41J 2/07; B41J 2/135; B41J 2/21; B41J 2/2132; B41J 2/5056; B41J 2/04535; B41J 11/36; B41J 11/42; B41J 11/425

USPC ............................................... 347/5, 9–16, 37
See application file for complete search history.

(56) References Cited

U.S. PATENT DOCUMENTS

| | | | |
|---|---|---|---|
| 6,523,939 B1 * | 2/2003 | Ellson et al. | 347/46 |
| 2003/0035022 A1 * | 2/2003 | Otsuki | 347/41 |
| 2009/0251499 A1 * | 10/2009 | Santo et al. | 347/9 |

FOREIGN PATENT DOCUMENTS

| | | | |
|---|---|---|---|
| JP | 2003-118097 A | 4/2003 |
| JP | 2007-196446 A | 8/2007 |
| JP | 2007-216641 A | 8/2007 |
| JP | 2007-237461 A | 9/2007 |

* cited by examiner

*Primary Examiner* — Geoffrey Mruk
*Assistant Examiner* — Scott A Richmond
(74) *Attorney, Agent, or Firm* — Global IP Counselors, LLP

(57) ABSTRACT

A printing device, which prints an image on a recording medium using a printing head which has a nozzle row, where a plurality of nozzles are aligned in a first direction, for each color of ink, including: a printing control section which executes a plurality of cycles of a dot forming action, where dots are formed on the recording medium along a second direction which intersects with the first direction by discharging ink from the nozzles while the printing head is moved in the second direction, and a transport action, where the recording medium is relatively transported in the first direction with regard to the printing head after completion of the dot forming action.

4 Claims, 9 Drawing Sheets

HALFTONE IMAGE DATA     NOZZLE ALIGNMENT POSITIONS

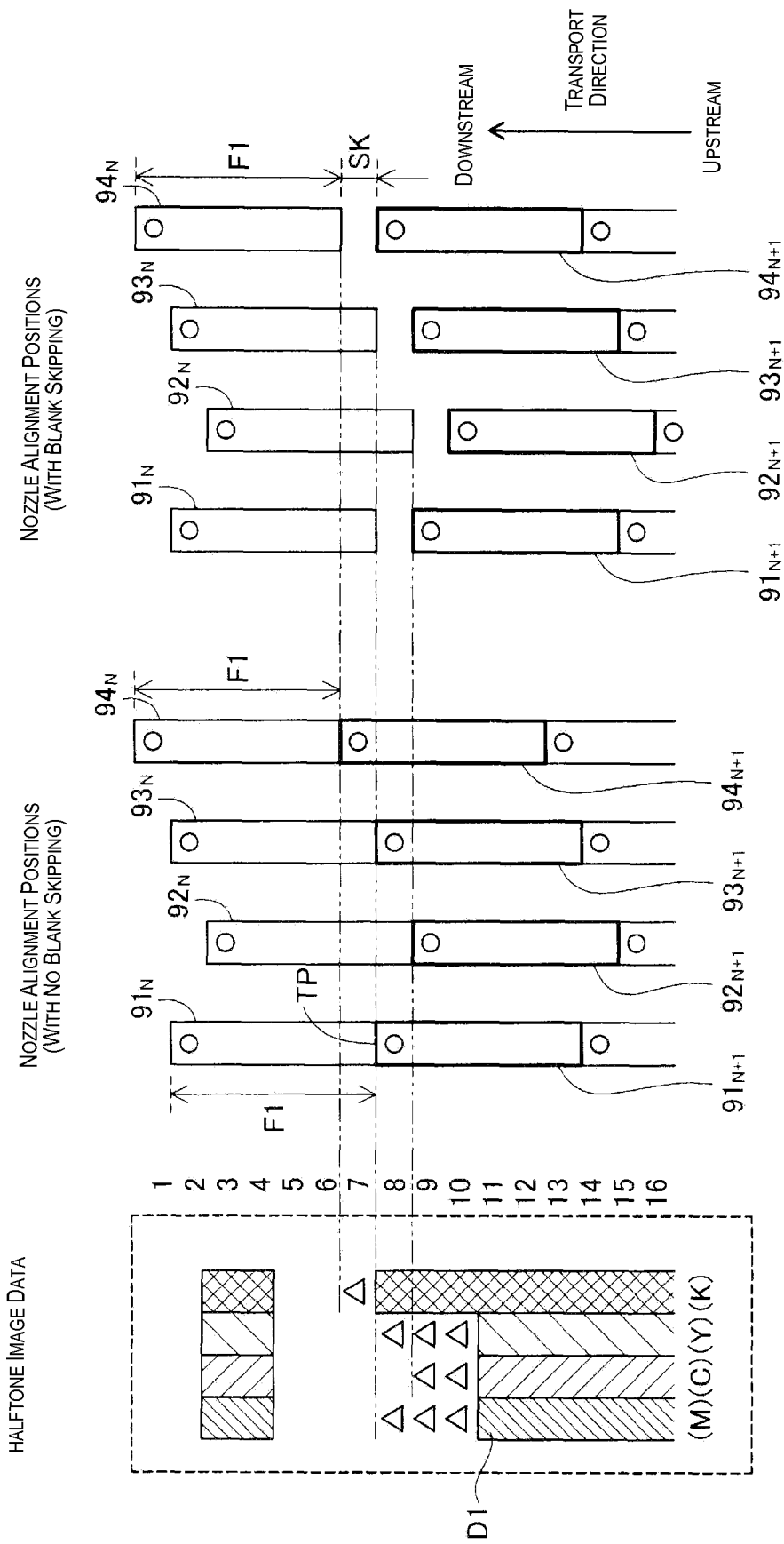

EXAMPLE IN PRIOR ART

HALFTONE IMAGE DATA

NOZZLE ALIGNMENT POSITIONS

PRINTING DEVICE AND PRINTING METHOD

CROSS-REFERENCE TO RELATED APPLICATIONS

This application claims priority to Japanese Patent Application No. 2012-088186 filed on Apr. 9, 2012. The entire disclosure of Japanese Patent Application No. 2012-088186 is hereby incorporated herein by reference.

BACKGROUND

1. Technical Field

The present invention relates to a technique where printing is performed using a printing head which has a plurality of nozzle rows.

2. Background Technology

In an ink jet printer which is one type of printing device, due to alternatingly repeating a dot forming action where dots are formed on a sheet of paper by ink being discharged from a nozzle on a printing head which moves in a movement direction and a transport action where the sheet of paper is transported in a transport direction, an image is printed by a plurality of dot rows (raster lines) along the movement direction being lined up in the transport direction on the sheet of paper.

In recent years, high quality image printing is possible in ink jet printers, but on the other hand, there is a desire to print a high quality image in a short period of time. Then, as the method of shortening the printing time, there is a so-called "blank skipping" method.

Blank skipping is performing the transport action with a large amount of transporting so as to skip a blank region in a case of printing a printing region and a blank region so as to line up in the transport direction on one sheet of paper. Then, in the current state of affairs, blank skipping methods such as Patent Documents 1 and 2 described below are proposed.

Japanese Laid-open Patent Publication No. 2007-216641 (Patent Document 1) and Japanese Laid-open Patent Publication No. 2007-237461 (Patent Document 2) are examples of the related art.

In well-known techniques, a blank region is detected depending on various conditions, but cases occur where the conditions are not satisfied and blank skipping is not possible even though blank skipping is essentially possible.

SUMMARY

Problems to be Solved by the Invention

The invention is carried out in order to solve the problem described above and has an advantage of increasing the chances for executing blank skipping by more accurate detection of blank regions.

Means Used to Solve the Above-Mentioned Problems

The invention is carried out in order to solve at least a portion of the problem described above and is able to be executed in the below formats or application examples.

Application Example 1

A printing device, which prints an image on a recording medium using a printing head which has a nozzle row, where a plurality of nozzles are aligned in a first direction, for each color of ink, is provided with a printing control section which executes a plurality of cycles of a dot forming action, where dots are formed on the recording medium along a second direction which intersects with the first direction by discharging ink from the nozzles while the printing head is moved in the second direction, and a transport action, where the recording medium is relatively transported in the first direction with regard to the printing head after completion of the dot forming action, wherein the printing control section is provided with a front position calculating section which calculates a front position of a dot region, which is able to be formed by the dot forming action in an $N+1^{th}$ (where N is an integer of one or more) cycle, for each nozzle row by a predetermined transport amount being added to the position of the dot region which is formed using the dot forming action of an $N^{th}$ cycle, a skipping amount calculating section which calculates the size of blanking regions for each color from each front position which has been calculated to a portion where a dot row of a color which corresponds to the nozzle row is requested and calculates the smallest amount out of the sizes of the blank regions of each color which have been calculated as a skipping amount, and a transport amount determining section which determines a transport amount in the transport action in the $N^{th}$ cycle by adding the skipping amount to the predetermined transport amount.

According to the printing device with this configuration, in the transport action which is executed after completion of the dot forming action of the $N^{th}$ cycle, it is possible to estimate the front position of the dot region which is able to be formed using each nozzle row in the dot forming action of the $N+1^{th}$ cycle and to set the skipping amount from the size of the blank regions of each color from each front position. As a result, it is possible to deal with cases where the blank region is small and more accurate detection of the blank regions is possible. Accordingly, this contributes to an effect where it is possible to increase the chances for executing blank skipping.

Application Example 2

The printing device which is described in application example 1 wherein the printing device has a plurality of printing heads which have a nozzle row for each color and control of the printing control section is performed with a virtual nozzle row for every color, which is configured from the nozzle rows with the same color for every printing head, as the nozzle row. According to this configuration, it is possible to perform blank skipping to correspond to the virtual nozzle row which is configured from the plurality of printing heads.

Application Example 3

The printing device which is described in application example 1 wherein the printing device is provided with a vertical alignment printing head where nozzle rows of each chromatic color are vertically aligned in the first direction. According to this configuration, it is possible to perform blank skipping to correspond to the vertical alignment printing head.

Application Example 4

A printing method, where an image is printed on a recording medium using a printing head which has a nozzle row, where a plurality of nozzles are aligned in a first direction, for each color of ink, includes executing a plurality of cycles of a dot forming action, where dots are formed on the recording medium along a second direction which intersects with the first direction by discharging ink from the nozzles while the printing head is moved in the second direction, and a transport action, where the recording medium is relatively transported in the first direction with regard to the printing head after completion of the dot forming action, wherein the executing includes calculating a front position of a dot region, which is able to be formed by the dot forming action in an $N+1^{th}$ (where N is an integer of one or more) cycle, for each nozzle row by a predetermined transport amount being added to the position of the dot region which is formed using the dot forming action of an $N^{th}$ cycle, calculating the size of blanking regions for each color from each front position which has been calculated to a portion where a dot row of a color which corresponds to the nozzle row is requested and calculates the smallest amount out of the size of the blank regions of each color which have been calculated as a skipping amount, and determining a transport amount in the transport action in the $N^{th}$ cycle by adding the skipping amount to the predetermined transport amount. The printing method of application example 4 is able to increase the chances for executing blank skipping in the same manner as the printing device of application example 1.

Furthermore, it is possible for the invention to be realized as various formats other than the above, and for example, to be a printing system which includes the printing device, a printing control device which is provided with each section which is included in the printing device, a format as a computer program which is executed with each section which is included in the printing device as a function, the computer program, a format such as a printing medium which records the computer program, and the like.

BRIEF DESCRIPTION OF THE DRAWINGS

Referring now to the attached drawings which form a part of this original disclosure:

FIGS. 7A to 7C are explanatory diagrams illustrating the relationship between halftone image data and the position of a nozzle row during a dot forming action;

DETAILED DESCRIPTION OF EXEMPLARY EMBODIMENTS

A. First Applied Example

A1. Configuration of Printing System

Figure 1:
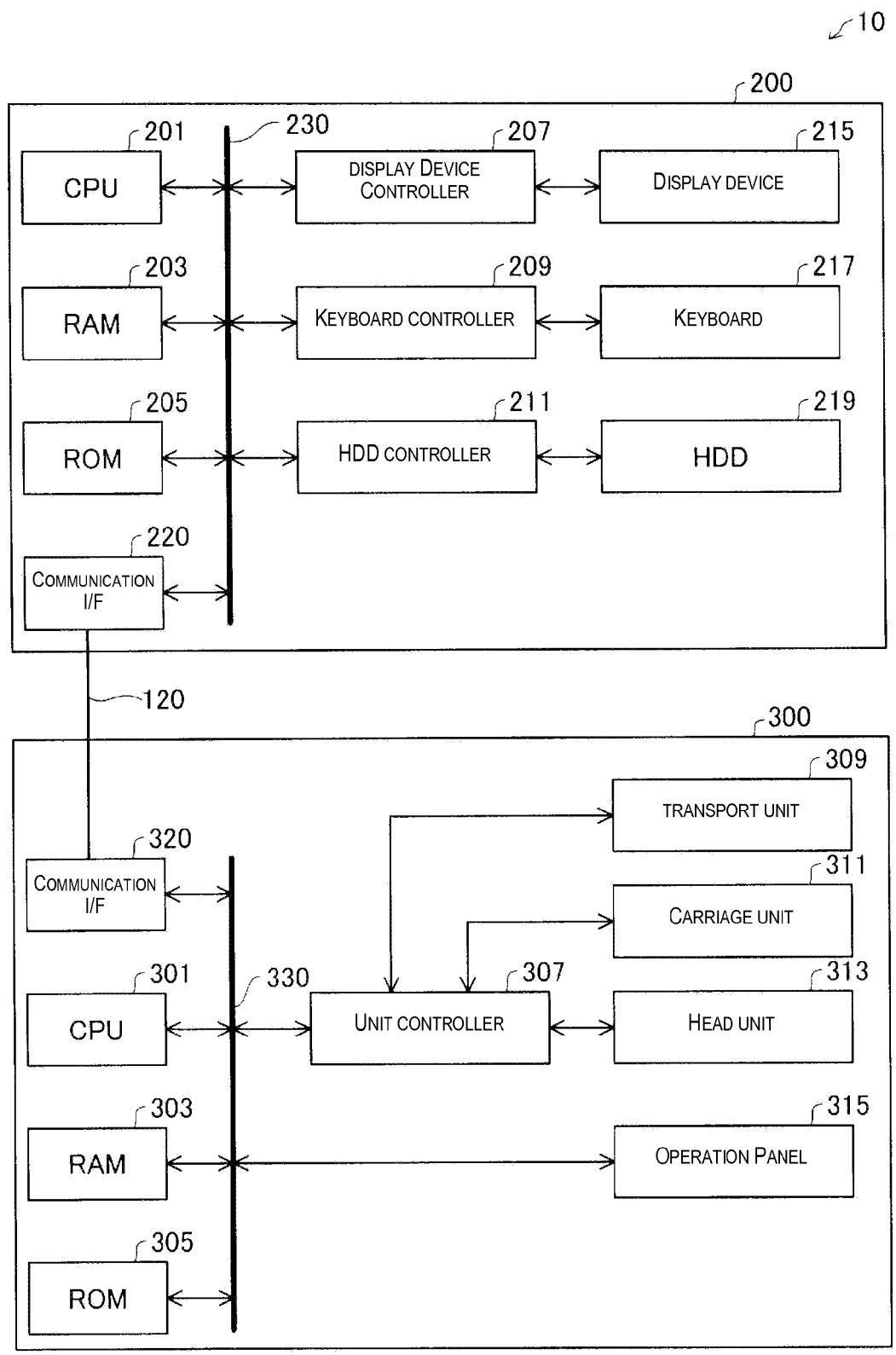
FIG. 1 is a block diagram illustrating a configuration of a printing system 10 of a first applied example.

FIG. 1 is a block diagram illustrating a configuration of a printing system 10. The printing system 10 is provided with a host computer 200 and a printer 300. The host computer 200 and the printer 300 are connected by a USB cable 120. The host computer 200 transmits data for printing (referred to below as "printing image data") to the printer 300. The printer 300 prints an image on a printing medium (a sheet of paper) based on the printing image data which is transmitted from the host computer 200. The printing image data is data which is generated based on the original image data using a printer driver in the host computer 200 and is dot data which indicates the presence or absence of each color of dot forming in each pixel.

The host computer 200 is provided with a CPU 201, a RAM 203, a ROM 205, a display device controller 207, a keyboard controller 209, a hard disk drive (HDD) controller 211, and a communication interface (I/F) 220. These constituent elements are connected to each other via a bus 230. A display device 215 is connected to the display device controller 207, a keyboard 217 is connected to the keyboard controller 209, and a hard disk drive (HDD) 219 is connected to the HDD controller 211. A USB cable 120 is connected to the communication I/F 220. The CPU 201 executes a computer program which is stored in the HDD 219 by reading out the computer program from the RAM 203 in order to control the overall actions of the host computer 200.

The printer 300 is an ink jet printer and is also a serial printer, and is provided with a CPU 301, a RAM 303, a ROM 305, a unit controller 307, an operation panel 315, and a communication interface (I/F) 320. These constituent elements are connected to each other by a bus 330. A transport unit 309, a carriage unit 311, and a head unit 313 are connected to the unit controller 307. The CPU 301 controls each of the units 309 to 313 using the unit controller 307.

Figure 2:
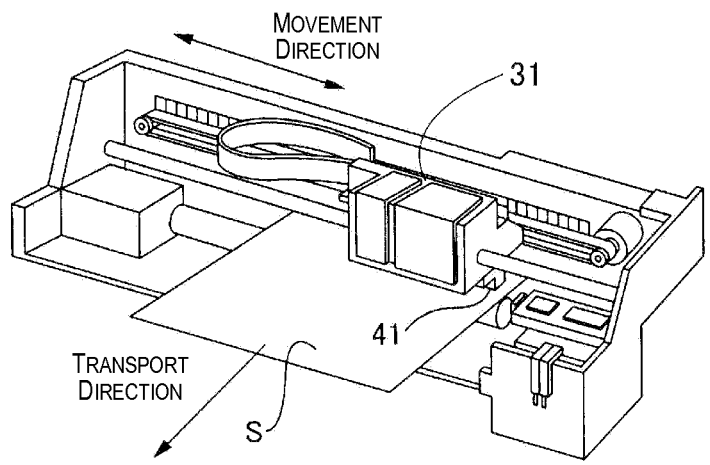
FIG. 2 is a perspective diagram of a portion of the inside of a printer.

FIG. 2 is a perspective diagram of a portion of the inside of the printer 300. Each of the units 309 to 311 which are shown in FIG. 1 will be described while appropriately referencing FIG. 2. The transport unit 309 is for sending a paper sheet S to a position where printing is possible and transporting the paper sheet S by a predetermined transport amount in a transport direction during printing. The carriage unit 311 is for moving a head 41 (FIG. 2) which is mounted on a carriage 31 (FIG. 2) in a direction which intersects with the transport direction (referred to below as the "movement direction"). The head unit 313 is for discharging ink onto the paper sheet S and has the head 41. A plurality of nozzles are provided on a lower surface of the head 41 and ink is discharged from the nozzles. Here, in the printer 300 in the present embodiment, ink is discharged from the head 41 and printing is performed in two directions when the head 41 is moved from one side in a movement direction to when the head is moved to the other side. The transport direction corresponds to a sub-scanning direction and is equivalent to "the first direction" which is referred to in the invention and the movement direction corresponds to a main scanning direction and is equivalent to "the second direction" which is referred to in the invention.

A2. Nozzle Alignment and Band Printing

Figure 3:
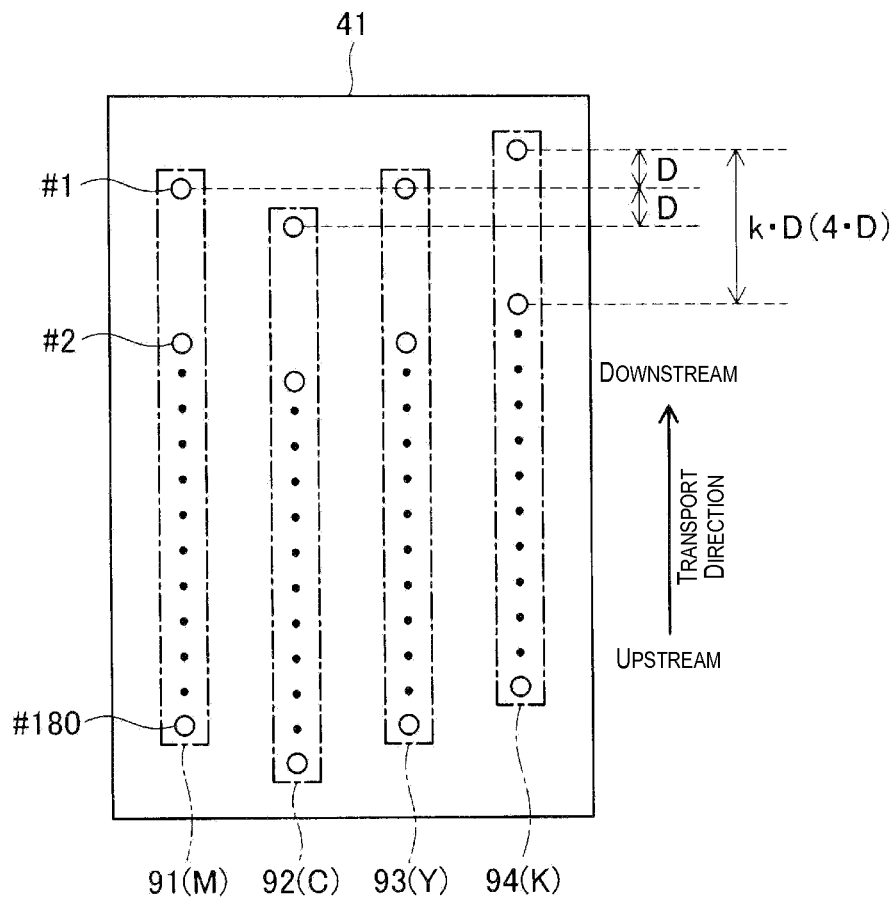
FIG. 3 is an explanatory diagram of nozzle alignment in a printing head 41.

FIG. 3 is an explanatory diagram of a nozzle alignment in the printing head 41. As shown in the diagram, a magenta nozzle row 91 which discharges magenta (M) ink, a cyan nozzle row 92 which discharges cyan (C) ink, a yellow nozzle row 93 which discharges yellow (Y) ink, and a black nozzle row 94 which discharges black (K) ink are formed on the lower surface of the head 41. Each of the nozzle rows 91 to 94 are provided with the same number of nozzles (for example, 180) which are discharge ports for discharging each color of ink. Then, ink chambers (not shown in the diagram) and piezoelectric elements (not shown in the diagram) are provided in each of the nozzles, the ink chambers expand and contract due to the driving of the piezoelectric elements, and ink droplets are discharged from each of the nozzles.

The plurality of nozzles in each of the nozzle rows 91 to 94 are lined up in rows with constant intervals (a nozzle pitch: k·D) along the transport direction and the nozzles in the nozzle rows 91 to 94 are given numbers (#1 to #180) which are smaller toward the nozzles on the downstream side. Here, D is the smallest dot pitch in the transport direction (that is, the interval with the highest resolution of dots which are formed on the sheet of paper), and in addition, k is an integer of two or more. For example, k is four in a case where the dot pitch is 180 dpi ($\frac{1}{180}$ inch) and the smallest dot pitch in the transport direction is 720 dpi ($\frac{1}{720}$ inch). Here, it is possible to form dots with a size which is suitable for the dot pitch when performing printing by changing each of the values of 180 dpi or 720 dpi.

Since the number of nozzles is the same as described above, and in addition, the nozzle pitches k·D are the same as each other in each of the nozzle rows 91 to 94, the entire lengths of each of the nozzle rows 91 to 94 in the transport direction (the interval between the center of the nozzle #180 which is furthermost upstream in the transport direction out of the nozzle groups and the center of the nozzle #1 which is furthermost downstream) are the same as each other.

In the present embodiment, the alignment position of each of the nozzle rows 91 to 94 in the transport direction is not the same. As shown in the diagram, the black nozzle row 94 is disposed in a position which is most toward the rear at the downstream side in the transport direction. The magenta nozzle row 91 and the yellow nozzle row 93 are disposed to be deviated in the upstream direction with regard to the black nozzle pitch 94 by the dot pitch (=D). The cyan nozzle row 92 is disposed to be deviated in the upstream direction with regard to the black nozzle pitch 94 by the two dot pitches (=2·D). Here, the alignment positions of each of the nozzle rows 91 to 94 are one example and the invention is not limited to these alignment positions. For example, other alignment positions are possible such as a zig-zag alignment with two alternating positions in the transport direction or an inclined alignment where there is deviation which gradually increases to the upstream side (or the downstream side) in the transport direction.

In the serial printer 300 with such a configuration, a dot forming action, where dots are formed on the paper sheet S by ink being intermittently discharged from the head 41 which is moved in the movement direction by the carriage unit 31, and a transport action, where the paper sheet S is relatively transported in the transport direction by the transport unit 309, are alternately repeated. As a result, it is possible to form dots in positions which are different to the positions of the dots which are formed by the previous dot forming action and it is possible to form a two-dimensional image on the sheet of paper.

Figure 4:
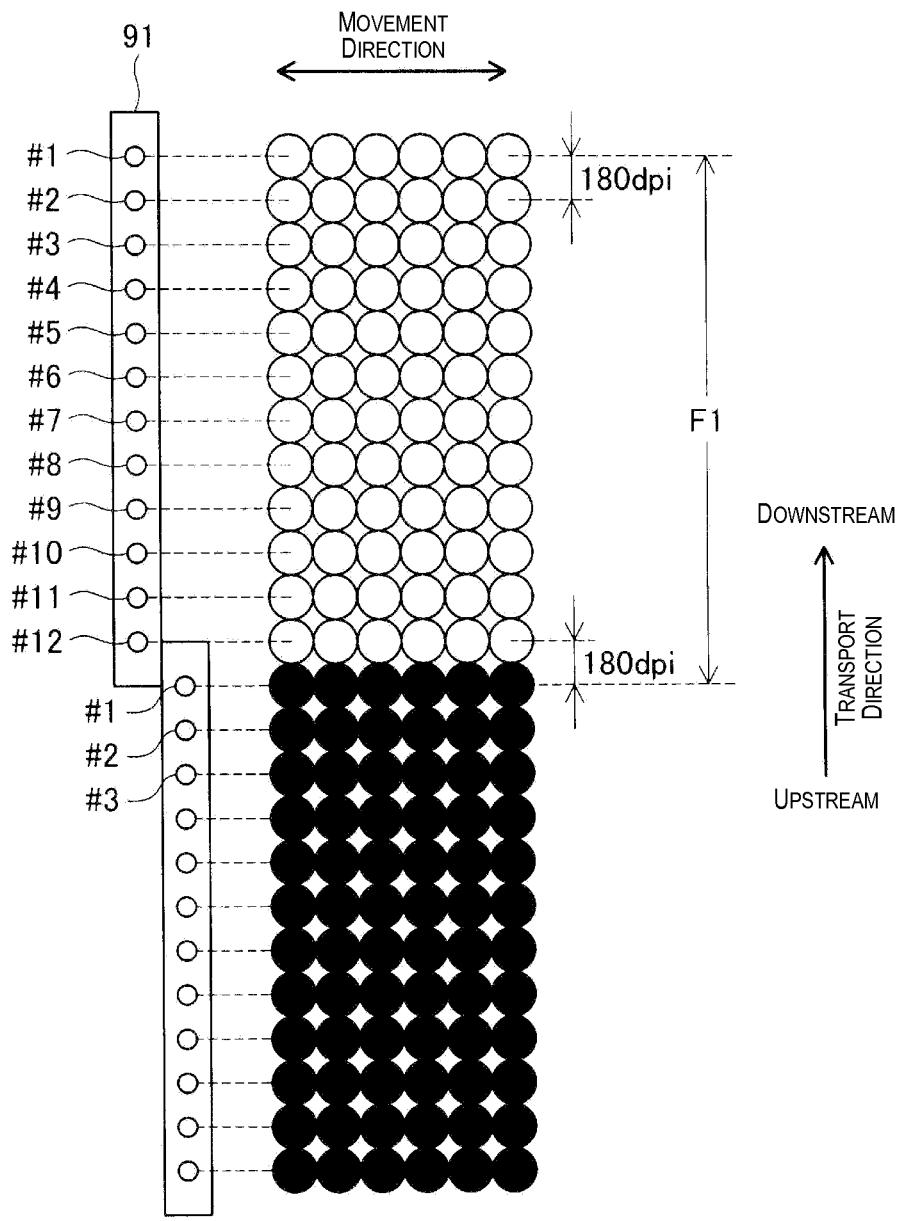
FIG. 4 is an explanatory diagram illustrating the appearance of band printing.

FIG. 4 is a diagram illustrating the appearance of the forming of a two-dimensional image. In order to simplify the description, the number of nozzles in the nozzle rows is set to 12. In the diagram, the magenta nozzle row (referred to here simply as the nozzle row) 91 is shown as a representative example. Essentially, the paper sheet S is transported in the transport direction with regard to the nozzle row 91 in the printer 300, but the nozzle row 91 is drawn in the diagram to move in the transport direction. The dot forming action, where a dot region is printed by moving once in the movement direction of the nozzle row 91 (also referred to below as a pass), and the transport action, where a sheet of paper is transported by a predetermined transport amount F1 so that the interval between the dots which are positioned at an edge portion of the dot region is the nozzle pitch (180 dpi), are alternately repeated.

In FIG. 4, a dot region which is configured by white circular dots (○) in an earlier pass is formed and a dot region which is configured by black circular dots (●) in a latter pass is formed. In one of the dot regions, a dot row (below, a raster line) where a plurality of dots are lined up in the movement direction are configured to be lined up in the transport direction for every other nozzle pitch (180 dpi) for the number of nozzles. In addition, the paper sheet transport amount F1 is determined so that an interval between the raster line which is most to the upstream side in the dot region (○) in the earlier pass and the raster line which is most to the downstream side in the dot region (●) in the latter pass is the nozzle pitch 180 dpi.

A printing region with the height of the head (=(number of nozzles)×nozzle pitch) of the printing head 41 is completed due to one pass of the dot forming action. Then, in the transport action which is carried out after each of the dot forming actions, the paper is transport by a transport amount which is the height of the head, and due to this, an image is formed (printed) on the paper by the dot region being combined in the transport direction for every dot forming action. The dot region is referred to as a band region since the dot region is a region with a band shape and such printing is referred to as "band printing".

A3. Printing Process

The printing process which is executed at the host computer 200 side will be described next. A printer driver is installed in advance in the HDD 219 (FIG. 1) of the host computer 200. The CPU 201 performs a printing process where the image data which is output from an application program is converted into printing image data by the printer driver being executed by being read out to the RAM 203 from the HDD 219. The printer driver is a computer program and is recorded on a recording medium (a recording medium which is able to be read out by a computer) such as a CD-ROM or a DVD-ROM. Alternatively, it is possible for the printer driver to be downloaded to the host computer 200 via the Internet. Here, the computer program is configured from a code for realizing various types of functions.

Figure 5:
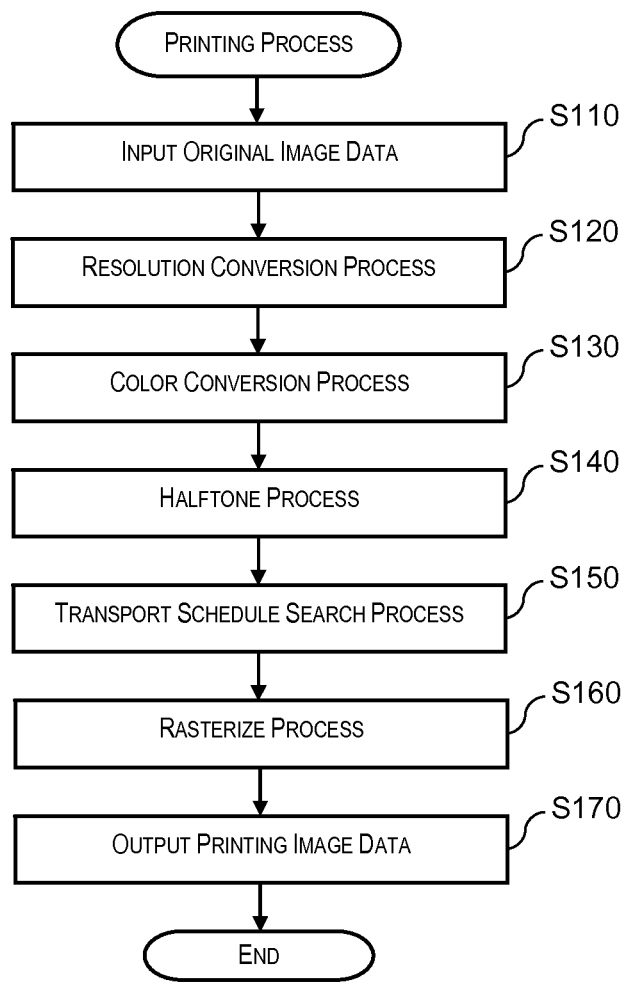
FIG. 5 is a flow chart illustrating a printing process.

FIG. 5 is a flow chart illustrating the printing process which is executed by the CPU 201 of the host computer 200. The printing process starts to be executed with a printing start instruction as a reference. When the process starts, first, the CPU 201 inputs the original image data which is the printing target from the application program (step S110). Next, the CPU 201 performs a resolution conversion process where resolution (printing resolution) is converted when the original image data is printed into a sheet of paper (step S120). For example, in a case where the printing resolution is specified at 180×180 dpi, the vector format image data which is received from the application program is converted to bit map format image data with a resolution of 180×180 dpi. Here, each piece of pixel data in the image data after the resolution conversion process is multi-gradient (for example 256 gradients) RGB data which is expressed using RGB color space.

Next, the CPU 201 performs a color conversion process where the RGB data is converted to CMYK data which is expressed using CMYK color space (step S130). Here, the CMYK data is data which corresponds to the colors of the ink of the printer 300. The color conversion process is performed based on a table (a color conversion look up table LUT) where gradient values of the RGB data and gradient values of the CMYK data correspond. Here, the pixel data after the color conversion process is CMYK data with 256 gradients which is expressed using CMYK color space.

Next, the CPU 201 performs a halftone process where the CMYK data with a high number of gradients is converted into data with a number of gradients which the printer 300 is able to form (step S140). For example, the data which is expressed using 256 gradients is converted into one bit of data which expresses two gradients or two bits of data which expresses four gradients using the halftone process. A dither method, γ correction, an error diffusion method, or the like is used in the halftone process. The data where the halftone process has been carried out is the same resolution as the printing resolution (for example, 720×720 dpi). In the image data after the halftone process, pixel data of one bit or two bits corresponds to each pixel and the pixel data is data which expresses the formation situation of the dots for each pixel (presence or absence of a dot and dot size). It is possible to change the size of the dots so as to be, for example, "large", "medium", or "small".

Next, the CPU 201 performs a transport schedule search process where the transport amount of the sheet of paper in the transport action, which is carried out for every dot forming action during printing, is searched for (step S150). Then, each of the transport amounts which are the search results are stored in a transport schedule table to relate to the order of the dot forming actions. The transport amounts described above is equivalent to the transport amount F1 in FIG. 4. Here, the transport schedule search process can be performed within a rasterize process which will be described later. The transport schedule table is stored in the RAM 203.

Next, the CPU 201 performs the rasterize process where the pixel data which is lined up in a matrix format is reordered in accordance with the dot forming ordering during printing (step S160). For example, in a case where the dot forming process is performed by being divided into a number of times during printing, the pixel data which corresponds to each of the dot forming actions are each extracted and reordered in accordance with the ordering of the dot forming processes. Here, the rasterize process is performed according to the printing method since the dot forming ordering during printing is different if the printing method is different. The pixel data which is generated through the rasterize process is configured as the printing image data. In addition, in the rasterize process, the transport amount is recorded in the printing image data so as to correspond to each of the dot forming actions, but the recording is performed by referencing the corresponding transport amount from the transport schedule table.

Next, the CPU 201 transmits the pixel data which has been generated in step S160 to the printer 300 as the printing image data (step S170). After the executing of step S170, the printing process is complete.

A4. Transport Schedule Search Process

In a case where a blank region, where raster lines are not formed in a continuous manner spanning a predetermined range in the transport direction, exists in the image which is expressed using the original image data which is the printing target, a process is performed where the sheet of paper is transported to skip past the blank region and the printing time is shortened. This is referred to as blank skipping, but blank skipping is achieved by increasing the actual transport amount to be more than the band printing and the transport amount F1 which is already set between the band printing.

Figure 6:
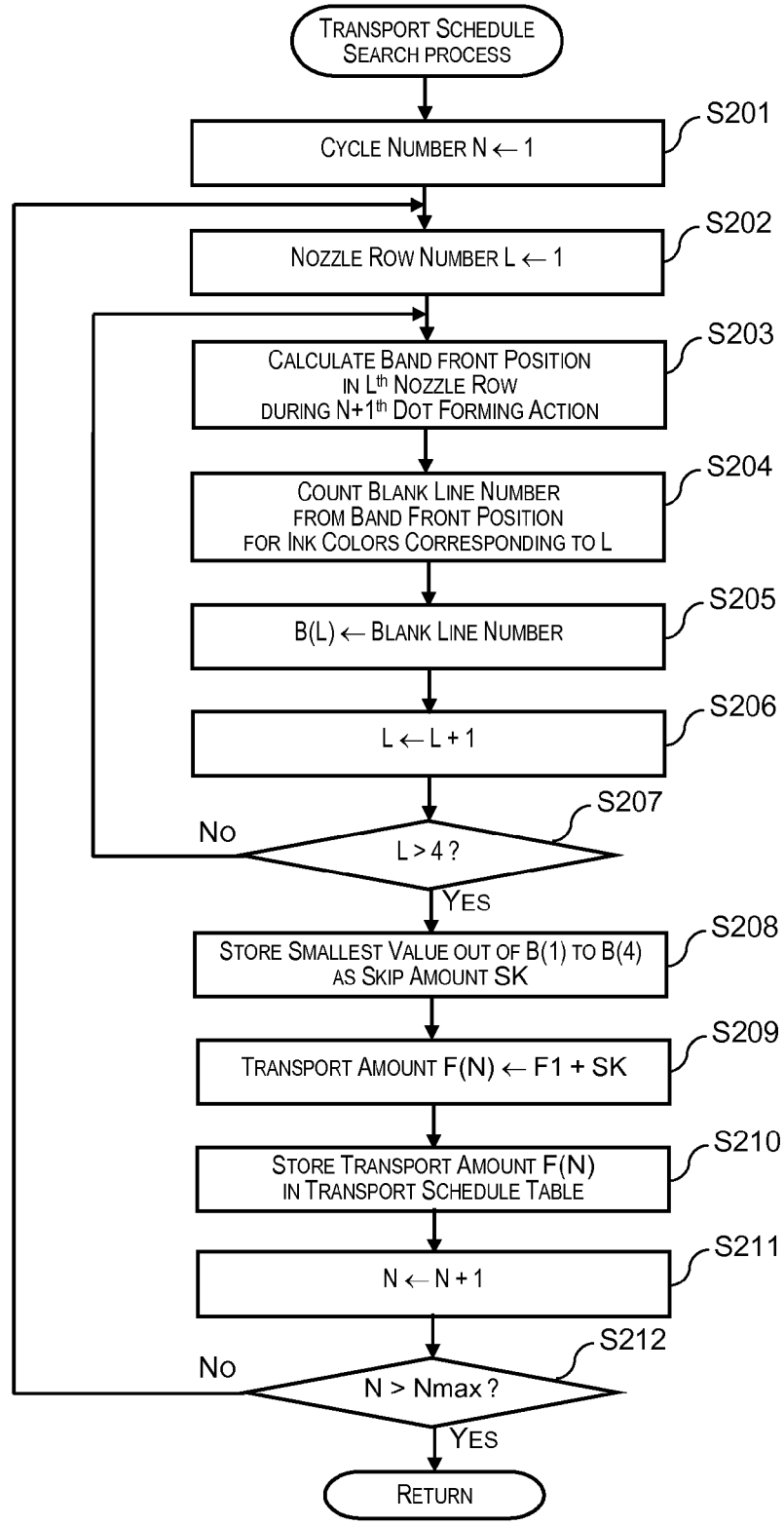
FIG. 6 is a flow chart illustrating a transport schedule search process which is executed in the printing process.

FIG. 6 is a flow chart illustrating the transport schedule search process which is executed in step S150 of the printing process. When the process starts, first, the CPU 201 sets an initial value of "1" as a cycle number N (step S201). In the specifications, one unit of the dot forming action during printing is referred to as a "cycle" and the cycle number N is a variable which expresses the ordering of the cycle.

Next, the CPU 201 sets an initial value of "1" as a nozzle row number L (step S202). The nozzle row number L is a variable which specifies the nozzle rows 91 to 94. Here, the magenta row 91 is indicated when L=1, the cyan row 92 is indicated when L=2, the yellow row 93 is indicated when L=3, and the black row 94 is indicated when L=4. After this, the CPU 201 calculates a band front position in the nozzle row which corresponds to the nozzle row number L during the dot forming action of the $(N+1)^{th}$ time where the value of one is added to the cycle number N (step S203). In the specifications, the "band front position in the nozzle row" has the meaning of a front (front on the downstream side in the transport direction) position of the dot region (the band region) which is formed by moving to the movement direction of the nozzle row.

FIGS. 7A to 7C are explanatory diagrams illustrating the relationship between the image data after the halftone process (referred to below as "halftone image data") and the position of the nozzle row during the dot forming action. FIG. 7A shows the halftone image data and FIG. 7B shows the position of the nozzle row during the dot forming action at the time of band printing where blank skipping is not performed. Here, FIG. 7C shows the position of the nozzle row when blank skipping has been performed using the transport schedule search process. As shown in FIG. 7B, the nozzle row moves in the sub-scanning direction so as to be the nozzle rows $91_N$ to $94_N$ during the $N^{th}$ dot forming action and the nozzle rows $91_{N+1}$ to $94_{N+1}$ during the $(N+1)^{th}$ dot forming action at the time of band printing. The transport amount from the previous nozzle rows $91_N$ to $94_N$ to the next nozzle rows $91_{N+1}$ to $94_{N+1}$ is F1 in the diagram. F1 is the prescribed transport amount and is equivalent to the "predetermined transport amount" in application example 1. According to step S203 (FIG. 6) of the transport schedule search process, a band front position TP of the nozzle row which corresponds to the nozzle row number L out of $91_{N+1}$ to $94_{N+1}$ is determined by adding the predetermined transport amount F1 to the band front position of the nozzle row which corresponds to the nozzle row number L out of $91_N$ to $94_N$. TP in the diagram is a case where the cycle number N is one.

After the executing of step S203, the CPU 201 performs a process where a blank line number is counted from the band front position TP with regard to the ink colors which correspond to L in the halftone image data (step S204). That is, the size of the blank region for each ink color in the halftone image data is determined as the blank line number. In the case of the halftone image data which is exemplified in FIG. 7A, the blank line number which is determined in the process of step S204 is the next value. In FIG. 7A, a raster number is given on the right side of the halftone image data. Since the ink color which corresponds to the cases where L=1 is magenta (M), the blank line number, from the band front position TP of the magenta nozzle row $91_{N+1}$ to magenta (M) data (a portion where a magenta dot row is requested) D1, is three lines where the raster numbers which are marked with Δ in the diagram are eight to ten.

After the executing of step S240 in FIG. 6, the CPU 201 stores the blank line number which is determined in step S204 in a buffer B (L) with regard to the ink color which corresponds to L (step S205). After this, the CPU 201 increments the nozzle row number L by a value of one (step S206) and evaluates whether or not the nozzle row number L has surpassed the value of four (step s207). Here, in a case where it is evaluated that the nozzle row number L has not surpassed the value of four, the process returns to step S203 and the processes of step S203 to step S205 are executed with regard to the next nozzle row.

In this manner, the blank line number from the band front position is stored with regard to CMYK in the buffers B(1) to B(4) until it is evaluated that the nozzle row number L has surpassed the value of four due to step S207. Due to step S207, when it is evaluated that the nozzle row number L has surpassed the value of four, the process moves to step S208 and the CPU 201 selects the smallest value out of the buffers B(1) to B(4) and stores the smallest value as a skipping amount.

In a case of the halftone image data which is exemplified in FIG. 7A, since the blank line number with regard to the black ink is the smallest with a value of one, a skipping amount SK is stored as the value of one. After the executing of step S208, the CPU 201 determines a transport amount F(N) based on the following equation (1) when the cycle number is N (step S209).

$$F(N)=F1+SK \quad (1)$$

Here, F1 is the prescribed transport amount (refer to FIG. 7B). SK is the skipping amount which is determined in step S208.

That is, as shown in FIG. 7C, according to step S209, the transport amount F(N) of the band printing in the earlier one cycle and the band printing in the latter one cycle is the skipping amount SK which is larger than the transport amount F1 which is set in advance, that is, is set to be larger than one pixel.

Returning to FIG. 6, after this, the CPU 201 stores the transport amount F(N) which is calculated in step S209 in the transport schedule table (S210). Next, the CPU 201 increments cycle number N by a value of one (step S211) and evaluates whether or not the cycle number N has surpassed a cycle number Nmax which corresponds to the final band image (step S212). Here, in a case where it is evaluated that N has not surpassed the cycle number Nmax, the process returns to step S202 and the processes from step S202 to step S212 are executed with regard to the band image of the next cycle number N. Due to the repeating of the process of step S202 to step S212, a search of the transport schedule is carried out with regard to the entire halftone image data which is the printing target. In step S212, in a case where it is evaluated that N has surpassed the cycle number Nmax, "returning" is halted and the transport schedule search process is complete.

In the printing process in FIG. 5, the CPU 201 functions as the "printing control section" in application example 1. Steps S202, S203, S206, and S207 in the transport schedule search process in FIG. 6 function as the "front position calculating section" in application example 1. The CPU 201 in the processes of steps S204, S205, and S208 functions as the "skipping amount calculating section" in application example 1. The CPU 201 in the processes of steps S209 and S210 functions as the "transport amount determining section" in application example 1.

A5. Effects of Applied Example

As described below, in the present applied example, in the transport action which is executed after completion of the dot forming action of the $N^{th}$ cycle, it is possible to estimate the band front position of each of the nozzle rows in the dot forming action of the $N+1^{th}$ cycle and to set the smallest amount from the blank line numbers from each of the band front positions as the skipping amount SK. That is, more accurate detection of the blank line number is possible. As a result, as exemplified in FIGS. 7A-7C, it is possible to perform blank skipping in a case where the blank line number is small, such as a value of one. Accordingly, this contributes to an effect where it is possible to increase the chances for executing blank skipping.

A6. Modified Example of First Applied Example

In the first applied example described above, one unit of each of the nozzle rows 91 to 94 are provided for every color of ink, but the invention is not limited to this. For example, it is possible to apply the invention to a printer which is provided with two printing heads which have nozzle rows with each ink color and which works out the raster numbers where it is possible to print with one pass in the movement direction by two printing heads being lined up in the transport direction. When considering that a nozzle row of a specific color which is provided in one of the printing heads and a nozzle row of the specific color which is provided in the other printing head are linked in the transport direction, it is possible to obtain one virtual nozzle row (referred to below as a "virtual nozzle row"), and it is sufficient to have a configuration where it is considered that the virtual nozzle row is the "nozzle row" in application example 1 and the band front position according to the virtual nozzle row is determined in step S203 in FIG. 6.

Figure 8A:
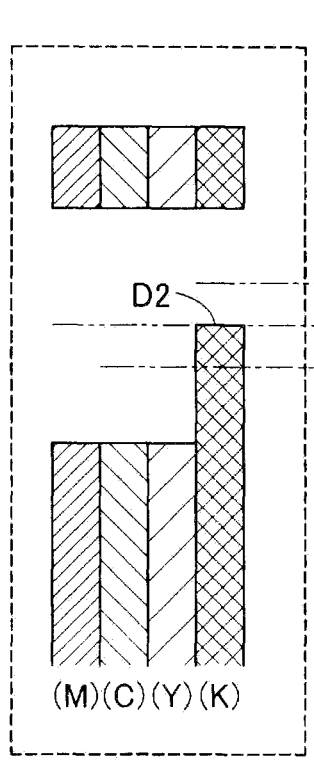
FIGS. 8A and 8B are explanatory diagrams illustrating a problem due to blanking skipping control in an example in the art.
Figure 8B:
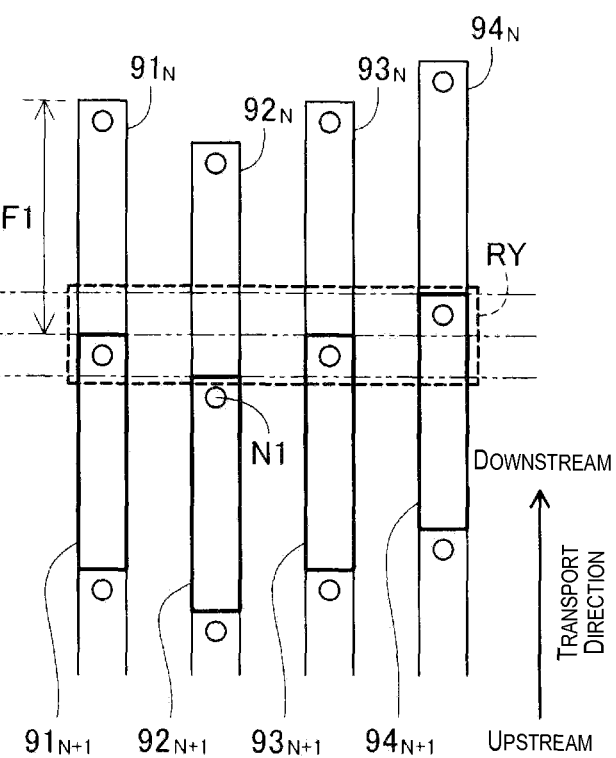

FIGS. 8A and 8B are explanatory diagrams illustrating a problem due to blanking skipping control in an example in the art. FIG. 8A shows the halftone image data and is the same as FIG. 7A which has previously been exemplified. According to the invention which is described in Patent Document 1 in the preceding Patent Literature (Japanese Unexamined Patent Application Publication No. 2007-216641), as shown in FIG. 8B, that the raster data, which is allocated to the nozzle which is more to the upstream side in the transport direction than the #1 nozzle N1 in the most upstream nozzle row 92 out of all of the nozzle rows 91 to 94 (that is, the nozzle which is included in a region RY), is blank data is set as a first condition. Furthermore, that a blank raster is one raster or more in a continuous manner from the raster position of the #1 nozzle N1 in the most upstream nozzle row 92 is set as a second condition, and blank skipping is performed when the first condition and the second condition are satisfied. However, since the position where the black (K) raster number is eight is not blank data, at least the first condition is not satisfied and blank skipping is not performed. Accordingly, blank skipping is not possible since the first condition and the second condition are not satisfied according to the invention which is described in Patent Document 1 even though blank skipping is possible. In contrast to this, blank skipping is possible in the first applied example as described above. Accordingly, it is possible to increase the chances for executing blank skipping according to the first applied example.

B. Second Applied Example

Figure 9:
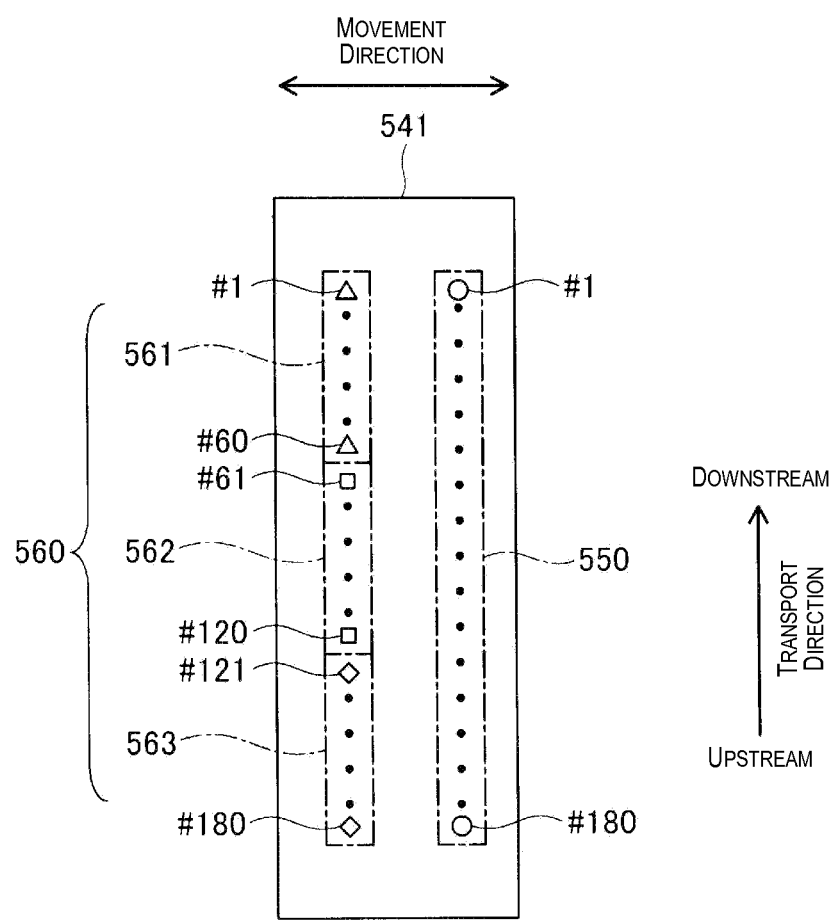
FIG. 9 is an explanatory diagram illustrating nozzle alignment in a printing head 541 in a second applied example.

FIG. 9 is an explanatory diagram illustrating a nozzle alignment of a printing head 541 in a second applied example. The printing head 541 in the second applied example differs in terms of the method of nozzle alignment compared to the printing head 41 in the first applied example. The printing head 41 in the first applied example is referred to as a "horizontal alignment head" where a plurality of nozzle rows for every color of ink exists in substantially the same position in the transport direction, but in contrast to this, the printing head 541 in the second applied example is referred to as a "vertical alignment head". Here, since the configuration other than the printing head 541 in the second applied example is the same as the first applied example, the same reference numerals as the first applied example are given to the same constituent elements and the description thereof is omitted.

As shown in FIG. 9, the printing head 541 has a black nozzle row 550 and a color nozzle row 560. Both of the nozzle rows 550 and 560 are each aligned on one straight line along the transport direction. The black nozzle row 550 (the nozzles are shown by o) has 180 nozzles #1 to #180. The color nozzle row 560 includes a yellow nozzle row 561 (the nozzles are indicated by Δ), a magenta nozzle row 562 (the nozzles are indicated by □), and a cyan nozzle row 563 (the nozzles are indicated by ◊). Here, in the specifications, the nozzle rows 561 to 563 for chromatic color inks are referred to as "chromatic color nozzle rows". Each of the chromatic color nozzle rows 561 to 563 have 60 nozzles #1 to #60 (61# to #120 or #121 to #180). In addition, the nozzle pitch of each of the chromatic color nozzle rows 561 to 563 is the same as the nozzle pitch of the black nozzle row 550. The nozzles of the chromatic color nozzle group are disposed in positions which are the same in the transport direction as the black nozzle row.

Ink droplets are discharged from each of the nozzles when the printing head 541 is moved with a constant speed in the main scanning direction during printing. However, it is not limited to all of the nozzles being normally used and there are cases according to the printing method where only a portion of the nozzles are used. It is possible to use all of the 180 black nozzles during black and white printing.

On the other hand, 60 nozzles are used with regard to each of the CMY colors and 60 nozzles can also be used for the black nozzles during color printing. The 60 black nozzles which are used during color printing are, for example, the nozzles #1 to #60 which are disposed in positions which are the same in the sub-scanning direction as the 60 yellow nozzles. That is, nozzles #1 to #60 are a virtual yellow nozzle row or a virtual black nozzle row, nozzles #61 to #120 are a virtual magenta nozzle row, and nozzles #121 to #180 are a virtual cyan nozzle row during color printing. The transport schedule search process (FIG. 6) in the first applied example is executed with the virtual nozzle rows as the nozzle rows. The printing process (FIG. 5) and the transport schedule search process (FIG. 6) in the first applied example are applied without change in the second applied example.

Figure 10A:
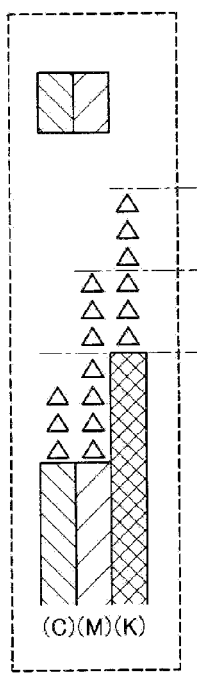
FIGS. 10A to 10C are explanatory diagrams illustrating the relationship between halftone image data and the position of a nozzle row during a dot forming action in the second applied example.
Figure 10B:
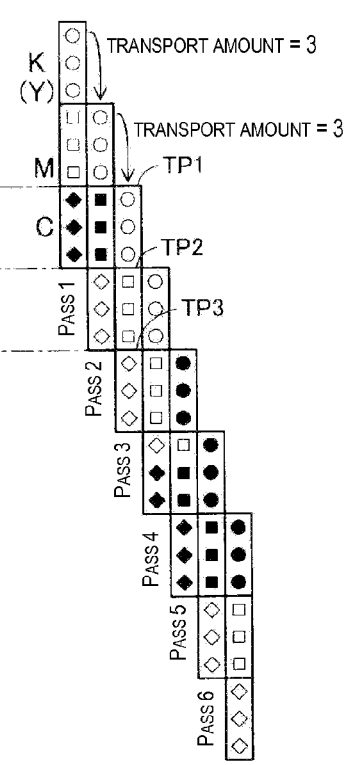
Figure 10C:
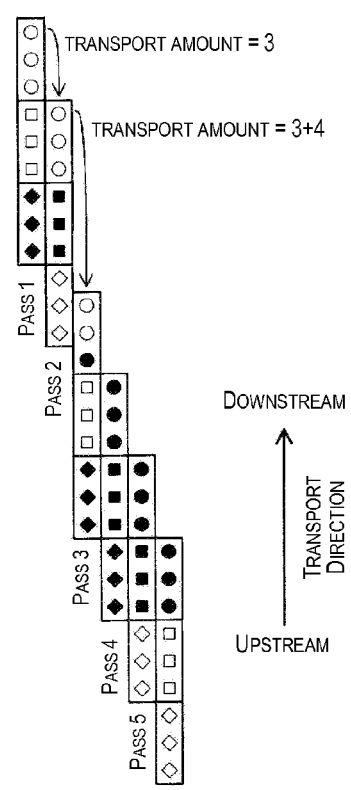

FIGS. 10A to 10C are explanatory diagrams illustrating the relationship between halftone image data and the position of a nozzle row during the dot forming action in the second applied example. FIG. 10A shows the halftone image data, FIG. 10B shows the position of the nozzle row during the dot forming action at the time of band printing where blank skipping is not performed, and FIG. 10C shows the position of the nozzle row during the dot forming action in the second applied example. In the diagram, the markings which are blacked out show the nozzles which are used in the printing of the halftone image data and the white markings show the nozzles which are not used.

Here, the transport action which is executed after the completion of the dot forming action in pass 2 in the diagram will be described as an example. The band front position of each of the nozzle rows in pass 3 is determined by the predetermined transport amount F1 being added to the band front position of each of the nozzle rows in pass 2 according to the process in step S203 in FIG. 6 after the completion of the dot forming action in pass 2. In FIG. 10B, TP1 is the front position of the virtual black nozzle row in pass 3, TP2 is the front position of the virtual magenta nozzle row in pass 3, and TP3 is the front position of the virtual cyan nozzle row in pass 3.

After this, the blank line number from the band front positions TP1 to TP3 is counted with regard to each of the colors according to step S204 in FIG. 6. In the case of the halftone image data which is exemplified in FIG. 10A, the blank line number from the band front position TP3 of the virtual cyan nozzle row to the cyan (C) data is four lines where the raster numbers which are marked with A in the diagram are 13 to 16. The blank line number from the band front position TP2 of the virtual magenta nozzle row to the magenta (M) data is seven lines where the raster numbers which are marked with A in the diagram are 10 to 16. The blank line number from the band front position TP1 of the virtual black nozzle row to the black (K) data is six lines where the raster numbers which are marked with Δ in the diagram are 7 to 12.

After this, four lines which have the smallest value from the blank line numbers which have been counted (four lines, seven lines, and six lines) are selected and four lines is set as the skipping amount SK according to step S208 in FIG. 6.

After this, the transport amount F is seven lines where three lines which is the prescribed transport amount is added to four lines which is the skipping amount SK according to step S209 in FIG. 6. As a result, as shown in FIG. 10(*a*) to FIG. 10(*c*), the transport action which is executed after the completion of the dot forming action in pass 2 is performed with the transport amount of seven lines.

Accordingly, according to the second applied example, as shown in FIG. 10(*a*) to FIG. 10(*c*), it is possible to perform blank skipping even with the printing head 541 with the vertical alignment method. In the art, blank skipping is not carried out in the printing head with the vertical alignment method, but in contrast to this, according to the second applied example, since it is possible to perform blank skipping using a control program which is the same as the first applied example, it is easy to develop programs.

C. Modified Examples

The invention is not limited to the first and the second applied examples or modified examples thereof and is able to be realized in various formats in a range which does not depart from the gist of the invention. For example, the following modifications are possible.

Modified Example 1

In each of the applied examples described above, the printing head has a configuration where four of the nozzle rows which correspond to each of the ink colors of CMYK are provided, but the invention is not limited to this. For example, the printing head can have a configuration where seven of the nozzle rows, which correspond to seven ink colors, that is, seven ink colors with light magenta, light cyan, and dark yellow being added to CMYK, are provided. Furthermore, it is possible for the number of nozzle rows to be another multiple and it is possible for the number of nozzle rows to be just one.

Modified Example 2

In each of the applied examples described above, the invention is realized at the host computer side, but the invention is not limited to this. For example, a configuration where the invention is realized at the printer side is possible. In addition, a configuration is possible where a RIP (raster image processor) performs all or a portion of the functions which are performed by the CPU 201 as software which is installed on the host computer 200. In addition, there can be configuration where the RIP performs the functions as hardware which is connected between the host computer 200 and the printer 300.

Modified Example 3

In each of the applied examples described above, a piezo element driving method is used as the ink discharging method for discharging the ink from the nozzles of the printing head of the printer, but the invention is not limited to this. For example, it is possible to use various methods such as a thermal method where bubbles are generated in the nozzles using a heat emitting element and ink is discharged using the bubbles.

Modified Example 4

In the applied examples and each of the modified examples described above, the functions which are realized using software can be realized using hardware, for example, a discrete electronic circuit.

Here, it is possible that elements other than the elements which have been described in the independent claims in the constituent elements in each of the applied examples and each of the modified examples described above to be an additional element or to be appropriately omitted.

What is claimed is:

1. A printing device, which prints an image on a recording medium using a printing head which has a nozzle row, where a plurality of nozzles are aligned in a first direction, for each color of ink, comprising:
a printing control section which executes a plurality of cycles of a dot forming action, where dots are formed on the recording medium along a second direction which intersects with the first direction by discharging ink from the nozzles while the printing head is moved in the second direction, and a transport action, where the recording medium is relatively transported in the first direction with regard to the printing head after completion of the dot forming action,
wherein the printing control section is provided with a front position calculating section which calculates a front position of a dot region, which is able to be formed by the dot forming action in an $N+1^{th}$ (where N is an integer of one or more) cycle, for each nozzle row by a predetermined transport amount being added to the position of the dot region which is formed using the dot forming action of an $N^{th}$ cycle, a skipping amount calculating section which calculates the size of blanking regions for each color from each front position which has been calculated to a portion where a dot row of a color which corresponds to the nozzle row is requested and calculates the smallest amount out of the sizes of the blank regions of each color which have been calculated as a skipping amount, and a transport amount determining section which determines a transport amount in the transport action in the $N^{th}$ cycle by adding the skipping amount to the predetermined transport amount.

2. The printing device according to claim 1, wherein the printing device has a plurality of printing heads which have a nozzle row for each color and control of the printing control section is performed with a virtual nozzle row for every color, which is configured from the nozzle rows with the same color for every printing head, as the nozzle row.

3. The printing device according to claim 1, wherein the printing device is provided with a vertical alignment printing head where nozzle rows of each chromatic color are vertically aligned in the first direction.

4. A printing method, where an image is printed on a recording medium using a printing head which has a nozzle row, where a plurality of nozzles are aligned in a first direction, for each color of ink, comprising:
executing a plurality of cycles of a dot forming action, where dots are formed on the recording medium along a second direction which intersects with the first direction by discharging ink from the nozzles while the printing head is moved in the second direction, and a transport action, where the recording medium is relatively transported in the first direction with regard to the printing head after completion of the dot forming action,
wherein the executing includes calculating a front position of a dot region, which is able to be formed by the dot forming action in an $N+1^{th}$ (where N is an integer of one or more) cycle, for each nozzle row by a predetermined transport amount being added to the position of the dot region which is formed using the dot forming action of an $N^{th}$ cycle, calculating the size of blanking regions for each color from each front position which has been calculated to a portion where a dot row of a color which corresponds to the nozzle row is requested and calculates the smallest amount out of the size of the blank regions of each color which have been calculated as a skipping amount, and determining a transport amount in the transport action in the $N^{th}$ cycle by adding the skipping amount to the predetermined transport amount.

* * * * *